(12) United States Patent
Hoshika et al.

(10) Patent No.: US 12,509,560 B2
(45) Date of Patent: Dec. 30, 2025

(54) RESIN PELLET GROUP AND LAMINATION STRUCTURE USING THE SAME

(71) Applicant: KURARAY CO., LTD., Okayama (JP)

(72) Inventors: Rina Hoshika, Okayama (JP); Yasushi Morihara, Okayama (JP)

(73) Assignee: KURARAY CO., LTD., Okayama (JP)

( * ) Notice: Subject to any disclaimer, the term of this patent is extended or adjusted under 35 U.S.C. 154(b) by 0 days.

(21) Appl. No.: 18/037,994

(22) PCT Filed: Dec. 16, 2021

(86) PCT No.: PCT/JP2021/046457
§ 371 (c)(1),
(2) Date: May 19, 2023

(87) PCT Pub. No.: WO2022/131321
PCT Pub. Date: Jun. 23, 2022

(65) Prior Publication Data
US 2024/0010799 A1     Jan. 11, 2024

(30) Foreign Application Priority Data
Dec. 17, 2020    (JP) .................. 2020-209750

(51) Int. Cl.
*C08J 3/12*     (2006.01)
*C08L 23/08*    (2025.01)
(Continued)

(52) U.S. Cl.
CPC .............. *C08J 3/12* (2013.01); *C08L 23/0846* (2013.01); *C08L 29/04* (2013.01);
(Continued)

(58) Field of Classification Search
None
See application file for complete search history.

(56) References Cited

U.S. PATENT DOCUMENTS

| 4,798,697 A | 1/1989 | Nohara et al. |
| 2016/0375622 A1 | 12/2016 | Usui |

FOREIGN PATENT DOCUMENTS

| JP | S62-227712 A | 10/1987 |
| JP | 2000-007794 A | 1/2000 |

(Continued)

OTHER PUBLICATIONS

International Search Report issued in corresponding International Patent Application No. PCT/JP2021/046457 dated Mar. 1, 2022.

*Primary Examiner* — Ronak C Patel
(74) *Attorney, Agent, or Firm* — Morgan, Lewis & Bockius LLP (57) ABSTRACT

A resin pellet group according to the present invention includes a pellet (A1) containing an ethylene-vinyl alcohol copolymer (a1), and a pellet (A2) containing an ethylene-vinyl alcohol copolymer (a2). Here, the pellet (A1) has a melt tension of 10 mN or more and 30 mN or less at a take-up speed of 50 m/min and 210° C., and the pellet (A2) has a melt tension of 2 mN or more and less than 10 mN at a take-up speed of 50 m/min and 210° C. Furthermore, an ethylene unit content ($EC_{a1}$) of the ethylene-vinyl alcohol copolymer (a1) is different from an ethylene unit content ($EC_{a2}$) of the ethylene-vinyl alcohol copolymer (a2), and a mass ratio (A1/A2) of the pellet (A1) to the pellet (A2) is set to 20/80 or more and 99/1 or less.

20 Claims, 2 Drawing Sheets

(51) Int. Cl.
*C08L 23/0846* (2025.01)
*C08L 29/04* (2006.01)
(52) U.S. Cl.
CPC ....... *C08L 2201/14* (2013.01); *C08L 2203/16* (2013.01); *C08L 2203/30* (2013.01); *C08L 2205/025* (2013.01); *C08L 2205/22* (2013.01)

(56) References Cited

FOREIGN PATENT DOCUMENTS

| | | |
|---|---|---|
| JP | 2001-151972 A | 6/2001 |
| JP | 2015-143349 A | 8/2015 |
| JP | 2016-155975 A | 9/2016 |
| WO | 2015/041135 A1 | 3/2015 |
| WO | 2016/080438 A1 | 5/2016 |

(a) Example 1

(b) Comparative Example 1

RESIN PELLET GROUP AND LAMINATION STRUCTURE USING THE SAME

TECHNICAL FIELD

The present invention relates to a resin pellet group and a layer structure using the same.

BACKGROUND ART

Ethylene-vinyl alcohol copolymers (hereinafter may be referred to as EVOH(s)) are resins that exhibit excellent gas barrier properties against oxygen, odors, flavors, and so forth, and are suitably used for packaging materials of food and the like. A packaging material for which such an EVOH is used may be required to have straight cuttability from the viewpoint of facilitating opening.

As a material that provides a packaging material having straight cuttability while retaining gas barrier properties, Patent Document 1 describes an EVOH resin composition composed of 70 to 95 wt % of EVOH, 3 to 25 wt % of aliphatic polyamide, and 2 to 13 wt % of semi-aromatic polyamide, and a multilayer structure for which the resin composition is used is described as having excellent linear cuttability.

RELATED ART DOCUMENTS

Patent Document

Patent Document 1: JP 2001-151972A

SUMMARY OF INVENTION

Problem to be Solved by the Invention

In production of packaging materials or containers, for example, ends (trims), defective products, and the like generated during production may be recovered and melt-molded for reuse. However, in the case of using an EVOH resin composition containing a certain amount of a polyamide resin, such as the one described in Patent Document 1 above, a crosslinking reaction occurs between the polyamide resin and the EVOH when the resin composition is recovered for reuse. Accordingly, gel or the like tends to be formed, which may result in insufficient recovery. Therefore, there is a need for a material that has excellent linear cuttability to replace the material described in Patent Document 1 above.

Also, when a film of a layer structure is formed from such an EVOH resin composition, the film is oriented in the MD direction, as a result of which the layer structure has excellent linear cuttability in the MD direction, but, on the other hand, may have insufficient linear cuttability in the TD direction. Here, if the linear cuttability in the TD direction is excellent, when, after forming a film of a layer structure, the film is cut to a suitable size to produce a container, the direction in which the container is produced can be freely selected without being constrained to a cut direction, and it is thus possible to reduce the amount of trims. For this reason, there is a need for a material that has excellent linear cuttability in both the MD direction and the TD direction.

The present invention is to solve the above-described problem, and an object thereof is to provide a resin pellet group and a layer structure using the same, as well as a stretched multilayer structure, a packaging material, and a container with which it is possible to obtain a molded body that has excellent gas barrier properties and favorable linear cuttability in the MD direction and the TD direction.

Means for Solving the Problem

In other words, the invention is achieved by:
[1] a resin pellet group comprising:
a pellet (A1) containing an EVOH (a1); and a pellet (A2) containing an EVOH (a2), wherein the pellet (A1) has a melt tension of mN or more and 30 mN or less at a take-up speed of 50 m/min and 210° C., and the pellet (A2) has a melt tension of 2 mN or more and less than 10 mN at a take-up speed of 50 m/min and 210° C., an ethylene unit content ($EC_{a1}$) of the EVOH (a1) is different from an ethylene unit content ($EC_{a2}$) of the EVOH (a2), and a mass ratio (A1/A2) of the pellet (A1) to the pellet (A2) is 20/80 or more and 99/1 or less;
[2] the resin pellet group according to [1], wherein a total content of the EVOH (a1) and the EVOH (a2) is above 95 mass % relative to a total mass of the resin pellet group;
[3] the resin pellet group according to [1] or [2], wherein an absolute value of a difference between the ethylene unit content ($EC_{a1}$) of the EVOH (a1) and the ethylene unit content ($EC_{a2}$) of the EVOH (a2) is 5 mol % or more;
[4] the resin pellet group according to any one of [1] to [3], wherein the ethylene unit content ($EC_{a2}$) of the EVOH (a2) is larger than the ethylene unit content ($EC_{a1}$) of the EVOH (a1);
[5] the resin pellet group according to any one of [1] to [4], wherein the ethylene unit content ($EC_{a1}$) of the EVOH (a1) is 20 mol % or more and 50 mol % or less, and the ethylene unit content ($EC_{a2}$) of the EVOH (a2) is 30 mol % or more and 60 mol % or less;
[6] the resin pellet group according to any one of [1] to [5], wherein the pellet (A1) has a melt tension of 10 mN or more and 30 mN or less at a take-up speed of 80 m/min and 210° C., and the pellet (A2) has a melt tension of 2 mN or more and less than 10 mN at a take-up speed of 80 m/min and 210° C.;
[7] the resin pellet group according to any one of [1] to [6], wherein the mass ratio (A1/A2) is 50/50 or more and 99/1 or less;
[8] the resin pellet group according to any one of [1] to [7], wherein the resin pellet group is used for being directly melt-molded;
[9] a layer structure comprising a gas barrier layer formed from a melt-molded body of the resin pellet group according to any one of [1] to [8];
[10] the layer structure according to [9], wherein the gas barrier layer includes a matrix phase containing the EVOH (a1) as a main component, and a dispersion phase containing the EVOH (a2) as a main component, and the dispersion phase has an average particle size of 200 nm or more and 1.0 μm or less;
[11] the layer structure according to [9] or [10], further comprising a thermoplastic resin layer disposed on at least one side of the gas barrier layer;
[12] the layer structure according to any one of [9] to [11], comprising a coextruded structure of the gas barrier layer and the thermoplastic resin layer;
[13] a stretched multilayer structure comprising the layer structure according to any one of [9] to [12];
[14] a packaging material comprising the layer structure according to any one of [9] to [12];
[15] a container comprising the layer structure according to any one of [9] to [12]; and

[16] a method for producing a layer structure, the method comprising
a step of directly melt-molding a resin pellet group including a pellet (A1) containing an ethylene-vinyl alcohol copolymer (a1) and a pellet (A2) containing an ethylene-vinyl alcohol copolymer (a2), to form a gas barrier layer,
wherein the pellet (A1) has a melt tension of 10 mN or more and mN or less at a take-up speed of 50 m/min and 210° C., and the pellet (A2) has a melt tension of 2 mN or more and less than 10 mN at a take-up speed of 50 m/min and 210° C.,
an ethylene unit content ($EC_{a1}$) of the ethylene-vinyl alcohol copolymer (a1) is different from an ethylene unit content ($EC_{a2}$) of the ethylene-vinyl alcohol copolymer (a2), and
a mass ratio (A1/A2) of the pellet (A1) to the pellet (A2) is 20/80 or more and 99/1 or less.

Effects of the Invention

According to the present invention, it is possible to provide a resin pellet group and a layer structure using the same, as well as a stretched multilayer structure, a packaging material, and a container with which it is possible to obtain a molded body that has excellent gas barrier properties and favorable linear cuttability in the MD direction and the TD direction.

BRIEF DESCRIPTION OF DRAWINGS

FIG. 1 shows schematic diagrams illustrating a method for evaluating the linear cuttability of monolayer films obtained in examples and comparative examples, with FIG. 1(a) being a diagram illustrating a state in which a notch is formed in one end, in the minor axis direction, of a sample that has been cut out from a monolayer film, FIG. 1(b) being a diagram illustrating a state in which the sample provided with the notch is torn in the thickness direction of the monolayer film through expansion under predetermined conditions, and FIG. 1(c) being a diagram illustrating a state in which, when the sample provided with the notch is torn in the thickness direction of the monolayer film through expansion under the predetermined conditions, the tear direction curves, and the front end of the tear reaches one end of the sample in the major axis direction, whereby the sample breaks.

DESCRIPTION OF EMBODIMENT (Resin Pellet Group)

A resin pellet group according to the present invention includes: a pellet (A1) containing an EVOH (a1); and a pellet (A2) containing an EVOH (a2), wherein the pellet (A1) has a melt tension of 10 mN or more and 30 mN or less at a take-up speed of 50 m/min and 210° C., and the pellet (A2) has a melt tension of 2 mN or more and less than 10 mN at a take-up speed of 50 m/min and 210° C., an ethylene unit content ($EC_{a1}$) of the EVOH (a1) is different from an ethylene unit content ($EC_{a2}$) of the EVOH (a2), and a mass ratio (A1/A2) of the pellet (A1) to the pellet (A2) is 20/80 or more and 99/1 or less. By satisfying the above-described conditions, the pellet group of the present invention can provide a molded body (e.g., a layer structure) that has excellent melt moldability while retaining the inherent gas barrier property of the EVOH. Furthermore, surprisingly, the molded body has excellent linear cuttability. By including the pellets containing EVOH having different ethylene unit contents, the pellet group tends to have excellent melt moldability while retaining the gas barrier properties. Since the resin pellet group contains the pellet (A1) and the pellet (A2) having specific melt tensions, the resin pellet group tends to exhibit significant linear cuttability.

Here, the term "resin pellet group" in the present specification means a collection of resin pellets. Therefore, the resin pellet group of the present invention is a collection of resin pellets including the pellet (A1) and the pellet (A2). Preferably, the resin pellet group of the present invention is a dry-blended body including the pellet (A1) and the pellet (A2). Here, the term "dry-blended body" in the present specification means a state in which the pellets constituting the resin pellet group are sufficiently mixed. For example, the size of each of the resin pellets constituting the resin pellet group is not particularly limited, and the smallest unit of the resin pellet group is a dry-blended body constituted by a combination of one resin pellet of a certain kind and one resin pellet of another kind.

Both the EVOH (a1) and the EVOH (a2) contained in the pellet (A1) or the pellet (A2) are copolymers obtained by saponifying an ethylene-vinyl ester copolymer, for example. The production and saponification of the ethylene-vinyl ester copolymer can be performed using known methods as will be described below. Examples of vinyl esters used in such methods include fatty acid vinyl esters such as vinyl acetate, vinyl formate, vinyl propionate, vinyl pivalate, and vinyl versatate.

The ethylene unit content ($EC_{a1}$) of the EVOH (a1) is different from the ethylene unit content ($EC_{a2}$) of the EVOH (a2). The absolute value ($|EC_{a1}-EC_{a2}|$) of a difference between the ethylene unit content ($EC_{a1}$) and the ethylene unit content ($EC_{a2}$) is preferably 5 mol % or more, more preferably 7 mol % or more, and even more preferably 10 mol % or more. The absolute value ($|EC_{a1}-EC_{a2}|$) of a difference between the ethylene unit contents is preferably 20 mol % or less, and more preferably 18 mol %. When the absolute value ($|EC_{a1}-EC_{a2}|$) of a difference between the ethylene unit contents is in the above-described range, both the melt moldability and the gas barrier properties tend to be satisfied. Preferably, the ethylene unit content ($EC_{a2}$) is larger than the ethylene unit content ($EC_{a1}$). When the ethylene unit content ($EC_{a2}$) is larger than the unit content ($EC_{a1}$), the resulting molded body tends to have a phase separated structure, and the linear cuttability of the resulting molded body tends to be excellent.

The ethylene unit content ($EC_{a1}$) is preferably 20 mol % or more and 50 mol % or less, more preferably 22 mol % or more and 44 mol % or less, and even more preferably 24 mol % or more and 35 mol % or less. In contrast, the ethylene unit content ($EC_{a2}$) is preferably 30 mol % or more and 60 mol % or less, more preferably 35 mol % or more and 55 mol % or less, and even more preferably 40 mol % or more and 50 mol % or less. When the ethylene unit content ($EC_{a1}$) and the ethylene unit content ($EC_{a2}$) are in their respective ranges described above, both the melt moldability and the gas barrier properties tend to be satisfied. Both the ethylene unit content ($EC_{a1}$) and the ethylene unit content ($EC_{a2}$) of the EVOH (a2) can be measured using a nuclear magnetic resonance (NMR) method, for example.

Furthermore, in the resin pellet group of the present invention, the respective saponification degrees of the EVOH (a1) and the EVOH (a2) (i.e., the saponification degrees of the respective vinyl ester components of the EVOH (a1) and the EVOH (a2)) are, for example, preferably 85 mol % or more, more preferably 90 mol % or more, even more preferably 95 mol % or more, and particularly preferably 99 mol %. On the other hand, the respective saponification degrees of the EVOH (a1) and the EVOH (a2) are, for example, preferably 100% or less, and may be 99.99% or less. When the respective saponification degrees of the EVOH (a1) and the EVOH (a2) satisfy the above-described ranges, the resin pellet group of the present invention can have appropriate thermal stability. The above-described saponification degrees can each be calculated through $^1$H-NMR measurement of the peak area of hydrogen atoms included in the vinyl ester structure and the peak area of hydrogen atoms included in the vinyl alcohol structure.

The EVOH (a1) and/or the EVOH (a2) may also include a unit derived from another monomer other than ethylene, vinyl ester, and saponified products thereof, as long as the object of the present invention is not impaired. When the EVOH (a1) and/or the EVOH (a2) includes another monomer unit, the content of the other monomer unit relative to all of the structural units of the EVOH (a1) and/or the EVOH (a2) may be, for example, 30 mol % or less, 20 mol % or less, 10 mol % or less, or 5 mol % or less. When the EVOH (a1) and/or the EVOH (a2) includes a unit derived from the other monomer, the content thereof may be, for example, 0.05 mol % or more, or 0.1 mol % or more.

Examples of another monomer include alkenes such as propylene, butylene, pentene, and hexene; ester group-containing alkenes such as 3-acyloxy-1-propene, 3-acyloxy-1-butene, 4-acyloxy-1-butene, 3,4-diacyloxy-1-butene, 3-acyloxy-4-methyl-1-butene, 4-acyloxy-1-butene, 3,4-diacyloxy-1-butene, 3-acyloxy-4-methyl-1-butene, 4-acyloxy-2-methyl-1-butene, 4-acyloxy-3-methyl-1-butene, 3,4-diacyloxy-2-methyl-1-butene, 4-acyloxy-1-pentene, 5-acyloxy-1-pentene, 4,5-diacyloxy-1-pentene, 4-acyloxy-1-hexene, 5-acyloxy-1-hexene, 6-acyloxy-1-hexene, 5,6-diacyloxy-1-hexene, 1,3-diacetoxy-2-methylenepropane, or saponified products thereof; unsaturated acids such as acrylic acid, methacrylic acid, crotonic acid, itaconic acid, or anhydrides, salts, monoalkyl esters, or dialkyl esters thereof; nitriles such as acrylonitrile and methacrylonitrile; amides such as acrylamide and methacrylamide; olefin sulfonic acids such as vinyl sulfonic acid, allyl sulfonic acid, methallyl sulfonic acid, or salts thereof; vinylsilane compounds such as vinyltrimethoxysilane, vinyltriethoxysilane, vinyltri(β-methoxy-ethoxy)silane, and γ-methacryloxypropylmethoxysilane; alkyl vinyl ethers, vinyl ketones, N-vinylpyrrolidone, vinyl chloride, and vinylidene chloride.

The EVOH (a1) and/or the EVOH (a2) may be modified through urethanation, acetalization, cyanoethylation, oxyalkylenation, or the like as needed.

The EVOH (a1) and the EVOH (a2) can be obtained using a known method such as a bulk-polymerization method, a solution polymerization method, a suspension polymerization method, and an emulsion polymerization method. In one embodiment, a bulk-polymerization method or a solution polymerization method may be used in which polymerization can proceed without a solvent, or in a solution such as alcohol.

The solvent used in a solution polymerization method is not particularly limited, and examples thereof include alcohols, preferably lower alcohols such as methanol, ethanol, and propanol. The amount of the solvent used in a polymerization reaction solution may be selected taking into account the viscosity-average polymerization degree of the target EVOH or the chain transfer of the solvent, and the mass ratio (solvent/total monomers) of the solvent to the total monomers in the reaction solution is, for example, 0.01 to 10, and preferably 0.05 to 3.

Examples of a catalyst used in the above-described polymerization include azo-based initiators such as 2,2-azobisisobutyronitrile, 2,2-azobis-(2,4-dimethylvaleronitrile), 2,2-azobis-(4-methoxy-2,4-dimethylvaleronitrile), and 2,2-azobis-(2-cyclopropylpropionitrile); and organic peroxide-based initiators such as isobutyryl peroxide, cumyl peroxyneodecanoate, diisopropyl peroxycarbonate, di-n-propyl perpoxydicarbonate, t-butyl peroxyneodecanoate, lauroyl peroxide, benzoyl peroxide, and t-butyl hydroperoxide. The amount of the catalyst used in the polymerization is preferably 0.005 to 0.6 equivalents per vinyl ester component used in the polymerization.

The polymerization temperature is preferably 20° C. to 90° C., and more preferably 40° C. to 70° C. The polymerization time is preferably 2 hours to 15 hours, and more preferably 3 hours to 11 hours. The polymerization rate is preferably 10% to 90%, and more preferably 30% to 80%, relative to the vinyl ester charged. The resin content in the solution after the polymerization is preferably 5% to 85%, and more preferably 20% to 70%.

In the above-described polymerization, after polymerization has been performed for a predetermined time, or after a predetermined polymerization rate has been reached, a polymerization inhibitor is added as needed, and unreacted ethylene gas is removed through evaporation to remove unreacted vinyl ester, whereby an ethylene-vinyl ester copolymer solution is obtained.

An alkaline catalyst is added to the copolymer solution to saponify the copolymer. The saponification method may either be a continuous saponification method or a batch saponification method. Examples of the alkaline catalyst that can be added include sodium hydroxide, potassium hydroxide, and alkali metal alcoholates.

The EVOH that has been subjected to saponification reaction contains the alkaline catalyst, a by-product salt such as sodium acetate or potassium acetate, and other impurities, and it is therefore preferable to remove these impurities through neutralization or washing as needed. Here, when the EVOH that has been subjected to saponification reaction is washed with water (e.g., ion exchanged water) that is substantially free of predetermined ions (e.g., metal ions and chloride ions), a by-product salt such as sodium acetate or potassium acetate need not be completely removed, and a portion thereof may be left. Each of the EVOH (a1) and the EVOH (a2) can be synthesized through the subsequent drying.

In the resin pellet group of the present invention, the pellet (A1) and the pellet (A2) each independently have a predetermined melt tension.

Specifically, the pellet (A1) has a melt tension of 10 mN or more and 30 mN or less, preferably 10.5 mN or more and 25 mN or less, and more preferably 11 mN or more and 20 mN or less at a take-up speed of 50 m/min and 210° C. Here, the melt tension at a take-up speed of 50 m/min and 210° C. can be measured using "CAPILOGRAPH 1D" manufactured by Toyo Seiki Seisaku-sho, Ltd., for example. When the melt tension at a take-up speed of 50 m/min and 210° C. of a measured pellet deviates from the above-described range, the linear cuttability is reduced.

On the other hand, the pellet (A2) has a melt tension of 2 mN or more and 10 mN or less, preferably 3 mN or more and 9 mN or less, and more preferably 5 mN or more and 8 mN or less at a take-up speed of 50 m/min and 210° C. When the melt tension at a take-up speed of 50 m/min and 210° C. of a measured pellet deviates from the above-described range, the linear cuttability is reduced.

Also, the pellet (A1) has a melt tension of preferably 10 mN or more and 30 mN or less, more preferably 11 mN or more and 25 mN or less, and even more preferably 12 mN or more and 20 mN or less at a take-up speed of 80 m/min and 210° C. Here, the melt tension at a take-up speed of 80 m/min and 210° C. also can be measured using "CAPILOGRAPH 1D" manufactured by Toyo Seiki Seisaku-sho, Ltd., for example. By measuring, in addition to the melt tension at a take-up speed of 50 m/min and 210° C., the melt tension at a take-up speed of 80 m/min and 210° C. of a measured pellet, it is possible to evaluate whether the pellet has sufficient melt moldability. When a pellet has insufficient melt moldability, the pellet may break during measurement of the melt tension thereof at a take-up speed of 80 m/min and 210° C., and the melt tension may not be successfully measured. When the melt tension at a take-up speed of 80 m/min and 210° C. of a measured pellet is within the above-described range, the linear cuttability tends to be more favorable.

On the other hand, the pellet (A2) has a melt tension of preferably 2 mN or more and 10 mN or less, more preferably 3 mN or more and 9.5 mN or less, and even more preferably 4 mN or more and 9 mN or less at a take-up speed 80 m/min and 210° C. When the melt tension at a take-up speed of 80 m/min and 210° C. of a measure pellet is within the above-described range, the linear cuttability tends to be more favorable.

The melt tensions of the pellet (A1) and the pellet (A2) can be adjusted, for example, by the ethylene unit contents and the saponification degrees of the EVOH (a1) and the EVOH (a2), as well as the polymerization time, the amount of the polymerization catalyst, the polymerization temperature, or the like during synthesis of the EVOH (a1) and the EVOH (a2). The aforementioned melt tensions can also be adjusted according to the content of a boron compound described below or the like.

The pellets (A1) and (A2) each independently contain other components such as a thermoplastic resin other than the EVOH (a1) and the EVOH (a2), a metal salt, an acid, a boron compound, a plasticizer, a filler, an anti-blocking agent, a lubricant, a stabilizer, a surfactant, a coloring agent, an ultraviolet absorber, an antistatic agent, a desiccant, a crosslinking agent, and a reinforcement material such as various fibers, as long as the effects of the present invention are not impaired.

Examples of the other thermoplastic resin include various polyolefins (e.g., polyethylene, polypropylene, poly1-butene, poly4-methyl-1-pentene, ethylene-propylene copolymers, copolymers of ethylene and α-olefin having 4 or more carbon atoms, copolymers of polyolefin and maleic anhydride, ethylene-vinyl ester copolymers, ethylene-acrylic acid ester copolymers, or modified polyolefins obtained through graft modification with an unsaturated carboxylic acid or an derivative thereof), various polyamides (e.g., nylon 6, nylon 6.6, nylon 6/66 copolymers, nylon 11, nylon 12, and polymethaxylylene adipamide), various polyesters (e.g., polyethylene terephthalate, polybutylene terephthalate, and polyethylene naphthalate), polyvinyl chloride, polyvinylidene chloride, polystyrene, polyacrylonitrile, polyurethane, polycarbonate, polyacetal, polyacrylate, and modified polyvinyl alcohol resins. Note that, from the viewpoint of improving the recyclability, the pellet group of the present invention preferably does not contain 20 parts by mass or more, more preferably 13 parts by mass or more, and even more preferably 5 parts by mass or more of various polyamides. It is further preferable that the pellet group of the present invention substantially does not contain various polyamides, and it is particularly preferable that the pellet group of the present invention does not contain various polyamides.

The above-described metal salt is preferably an alkali metal salt, and more preferably an alkaline-earth metal salt, from the viewpoint of improving the thermal stability. When the pellet (A1) and/or (A2) contains a metal salt, the lower limit of the content thereof is preferably, for example, 1 ppm or more, 5 ppm or more, 10 ppm or more, or 20 ppm or more in terms of the metal atom in the metal salt, based on the pellet (A1) and/or (A2). When the pellet (A1) and/or (A2) contains a metal salt, the upper limit of the content thereof is preferably, for example, 10000 ppm or less, 5000 ppm or less, 1000 ppm or less, or 500 ppm or less in terms of the metal atom in the metal salt, based on the pellet (A1) and/or (A2). When the metal salt content is in the above-described range, the thermal stability and the hue of the pellet (A1) and/or (A2) during melt molding are favorable.

From the viewpoint of increasing the thermal stability when melt-molding the pellets (A1) and (A2), the above-described acid is preferably a carboxylic acid compound, a phosphoric acid compound, or the like. When the pellet (A1) and/or (A2) contains a carboxylic acid compound, the content thereof is preferably 1 ppm or more, more preferably 10 ppm or more, and even more preferably 50 ppm or more. On the other hand, the content of the carboxylic acid compound is preferably 10000 ppm or less, more preferably 1000 ppm or less, and even more preferably 500 ppm or less. When the pellet (A1) and/or (A2) contains a phosphoric acid compound, the content of the phosphoric acid compound in terms of phosphoric acid radicals is preferably 1 ppm or more, more preferably 10 ppm or more, and even more preferably 30 ppm or more. On the other hand, the content of the phosphoric acid compound in terms of phosphoric acid radicals is preferably 10000 ppm or less, more preferably 1000 ppm or less, and even more preferably 300 ppm or less. When the content of the carboxylic acid compound or the phosphoric acid compound is in the above-described range, the thermal stability and the hue of the pellet (A1) and/or (A2) during melt molding are favorable.

When the pellet (A1) and/or (A2) contains the above-described boron compound, the content thereof is preferably 1 ppm or more, more preferably 10 ppm or more, and even more preferably 50 ppm or more. On the other hand, the content of the boron compound is preferably 2000 ppm or less, more preferably 1000 ppm or less, and even more preferably 500 ppm or less. When the content of the boron compound is in the above-described range, the thermal stability of the pellet (A1) and/or (A2) during melt molding tends to be favorable. In addition, the melt tension tends to be increased when the boron compound is added.

The method for including the above-described other components in the pellet (A1) and/or (A2) is not particularly limited. For example, the other components may be added and kneaded when pelletizing a composition including the EVOH (a1) or the EVOH (a2) (i.e., when producing the pellet (A1) and/or (A2)). Examples of the method for adding the other components when producing the pellet (A1) and/or (A2) also include a method in which the other components are added in the form of a dry powder, a method in which the other components are added in the state of a paste impregnated with a predetermined solvent, a method in which the other components are added while being suspended in a predetermined liquid, a method in which the other components are dissolved in a predetermined solvent and added in the form of a solution, and a method in which the other components are immersed in a predetermined solution. Note that kneading need not be performed in the case of using the method in which the other components are immersed in a predetermined solution. Among these, the method in which a solution obtained by dissolving the above-described compounds in a predetermined solvent is added and kneaded, and the method in which the other components are immersed in a predetermined solution are preferable in that these compounds can be uniformly dispersed in the EVOH. The predetermined solvent is not particularly limited, but is preferably water from the viewpoints of solubility of the compounds to be added, cost, handleability, work environment safety, and so forth.

From the viewpoint of further exhibiting the effects of the present invention, the proportion of the EVOH (a1) in the pellet (A1) is preferably 90 mass or more, more preferably 95 mass % or more, even more preferably 97 mass % or more, and particularly preferably 99 mass % or more, and the pellet (A1) may essentially consist only of the EVOH (a1). The proportion of the EVOH (a2) in the pellet (A2) is preferably 90 mass or more, more preferably 95 mass % or more, even more preferably 97 mass % or more, and particularly preferably 99 mass % or more, and the pellet (A1) may essentially consist only of EVOH (a2). The total content of the EVOH (a1) and the EVOH (a2) in the resin pellet group of the present invention is preferably greater than 95 mass %, more preferably 97 mass % or more, and even more preferably 99 mass % or more, based on the total mass.

The resin pellet group of the present invention contains the pellet (A1) and the pellet (A2) at a predetermined mass ratio (A1/A2). Specifically, the mass ratio (A1/A2) of the pellet (A1) to the pellet (A2) is 20/80 or more and 99/1 or less, preferably 50/50 or more and 99/1 or less, and more preferably 70/30 or more and 95/5 or less. When the mass ratio (A1/A2) is less than 20/80 (i.e., when the content of the pellet (A2) is less than 20 parts by mass relative to 80 parts by mass of the pellet (A1)), the gas barrier properties are degraded. When the mass ratio (A1/A2) is above 99/1 (i.e., when the content of the pellet (A2) is less than 1 part by mass relative to 99 parts by mass of the pellet (A1)), the melt moldability is reduced. When the mass ratio (A1/A2) of the pellet (A1) to the pellet (A2) satisfies the above-described range, a molded body having excellent gas barrier properties and favorable linear cuttability in the MD direction and the TD direction can be obtained using the resin pellet group of the present invention.

The resin pellet group of the present invention may include a pellet other than the pellet (A1) and the pellet (A2). The proportion of the pellet (A1) and the pellet (A2) in the resin pellet group of the present invention is preferably 90 mass % or more, more preferably 96 mass % or more, even more preferably 98 mass % or more, and particularly preferably 99 mass % or more. The resin pellet group of the present invention may essentially consist only of the pellet (A1) and the pellet (A2), and the resin pellet group of the present invention may consist only of the pellet (A1) and the pellet (A2).

In obtaining a desired molded body, the resin pellet group of the present invention is preferably directly melt-molded for use. Here, the term "directly" in the expression "directly melt-molding" used in the present specification refers to directly using the pellets (A1) and (A2), which are the contents of the resin pellet group of the present invention, for producing a resin molded body, with each of the pellets (A1) and (A2) being kept in a pellet form (i.e., with the pellets (A1) and (A2) being dry-blended) in order to obtain a desired resin molded body, without being pelletized in advance, for example, through melt kneading. The term "resin molded body" used in the present specification encompasses a molded body obtained through secondary processing (molding) using a resin pellet, and specifically refers to a molded body other than a pellet.

For example, in the case of pelletizing the pellets (A1) and (A2) in advance through melt-kneading or the like, a melt-molded body obtained thereby does not exhibit linear cuttability in the TD direction when the melt-molded body has a layer structure such as a packaging material or the like. In contrast, in the case of melt-kneading the resin pellet group of the present invention in a state of a dry-blended body of the pellets (A1) and (A2), and using the resin pellet group for producing a predetermined molded body (melt-molded body), a melt-molded body obtained thereby, surprisingly, can impart favorable linear cuttability in both the MD direction and the TD direction to the layer structure when the melt-molded body has a layer structure such as a packaging material or the like. Although the reason for this is not clearly known, one possible reason is that the resin pellet group of the present invention is appropriately kneaded when directly melt-molded, and therefore the EVOH (a1) and the EVOH (a2) in the resulting melt-molded body form a specific phase separated structure.

(Layer Structure)

A layer structure of the present invention is a structure composed of one or more layers, and includes a gas barrier layer formed from the melt-molded body of the resin pellet group of the present invention. Here, the melt-molded body of the resin pellet group refers to a melt-molded body obtained by directly melt-molding the resin pellet group. From the viewpoint of further improving the gas barrier properties (e.g., oxygen-barrier properties), the layer structure may include either one gas barrier or a plurality of gas barrier layers, and the materials forming the gas barrier layers may be the same or different. The gas barrier layer is a layer having a function of preventing gas permeation, and, for example, has an oxygen transmission rate of 100 cc·20 $\mu$m/(m$^2$·day·atm) or less, preferably 50 cc·20 $\mu$m/(m$^2$·day·atm) or less, and more preferably 10 cc·20 $\mu$m/(m$^2$·day·atm) or less, as measured in accordance with JIS K 7126 (isopiestic method) under the conditions of 20° C. and 65% RH. Here, an oxygen transmission rate of "100 cc·20 $\mu$m/(m$^2$·day·atm)" means that the amount of oxygen permeation per day per m$^2$ of a 20 $\mu$m-thick film under 1 atmosphere of oxygen is 100 cc.

The number of layers in the layer structure of the present invention may be one, and preferably two or more. The number of layers in the layer structure of the present invention may be 13 or less. When the number of layers in the layer structure of the present invention is in the above-described range, favorable mechanical strength tends to be achieved.

According to the present invention, the lower limit of the average thickness of a single gas barrier layer formed from the melt-molded body of the resin pellet group is not necessarily limited, but is, for example, preferably 3 $\mu$m or more, and more preferably 5 $\mu$m or more, and may be preferably 10 $\mu$m or more. On the other hand, the upper limit of the average thickness of a single gas barrier layer may be, for example, 200 µm or less, or 100 µm or less. Here, the "average thickness" in the present specification is an average value of thicknesses measured at five randomly selected locations. When the average thickness of a single gas barrier layer is in the above-described range, the durability, flexibility, and appearance of the layer structure of the present invention tend to be favorable.

The gas barrier layer formed from the melt-molded body of the resin pellet group of the present invention preferably includes a matrix phase containing the EVOH (a1) as a main component, and a dispersion phase containing the EVOH (a2) as a main component. Here, the "main component" means a component constituting more than 50 mass % of a phase. The proportion of the EVOH (a1) in components constituting the matrix phase is preferably 80 mass % or more, more preferably 90 mass % or more, even more preferably 95 mass % or more, and particularly preferably 98 mass % or more, and the matrix phase may essentially consist only of the EVOH (a1). The proportion of the EVOH (a2) in components constituting the dispersion phase is preferably 80 mass % or more, more preferably 90 mass % or more, even more preferably 95 mass % or more, and particularly preferably 98 mass % or more, and the dispersion phase may essentially consist only of the EVOH (a2). When the gas barrier layer includes such a matrix phase and dispersion phase, it is possible to satisfy both the linear cuttability and the gas barrier properties. According to the present invention, when the gas barrier layer includes the matrix phase and the dispersion phase described above, the dispersion phase may exist in the form of particles having an average particle size of preferably 200 nm or more and 1.0 µm or less, more preferably 220 nm or more and 750 nm or less, and even more preferably 240 nm or more and 500 nm or less. When the average particle size of the particles constituting the dispersion phase is 200 nm or more, the linear cuttability tends to be favorable. When the average particle size of the particles constituting the dispersion phase is 1.0 µm or less, the gas barrier properties tend to be retained.

The average particle size of the particles constituting the dispersion phase can be adjusted by adjusting, for example, the mixing ratio or kneading conditions of the EVOH (a1) and the EVOH (a2). Examples of specific methods for adjusting the kneading conditions, for example, in the case of using a single-screw extruder include a method in which the resin residence time is adjusted according to the shape and the groove depth of the screw, and a method in which the shear viscosity is adjusted. As for the screw shape, for example, a full flighted screw or a barrier screw may be used. In order to adjust the kneading strength, a screw having a shape such as Maddock or Dulmage may be used. Additionally, the screw rotation rate may be adjusted to increase the shear rate. A twin-screw extruder may be used because the screw shape can be easily changed. In the case of using a twin-screw extruder, it is possible to use, for example, a method in which the length of the kneading disk is adjusted to adjust the kneading strength.

As a specific kneading condition in the case of using a single-screw extruder, for example, the lower limit of a shear rate r in the metering section of a melt extruder, as calculated from the following general expression (1), is preferably 10 sec$^{-1}$, more preferably 15 sec$^{-1}$, and particularly preferably 20 sec$^{-1}$. The upper limit of the shear rate r is preferably 100 sec$^{-1}$, more preferably 95 sec$^{-1}$, and particularly preferably 90 sec$^{-1}$. When kneading is performed under the condition in the above-described range, the average particle size of the particles constituting the dispersion phase can be easily adjusted in an appropriate range, and the linear cuttability tends to be favorable.

[Numerical Expression 1]

$$r = \frac{\pi \cdot DN}{60 \cdot h} \tag{1}$$

In Expression (1), D represents the cylinder diameter (cm), N represents the screw rotation rate (rpm), h represents the groove depth (cm) of the metering section, and r represents the shear rate (sec$^{-1}$).

The layer structure of the present invention may include, other than the gas barrier layer formed from the melt-molded body of the resin pellet group of the present invention, at least one other gas barrier layer. Examples of the material forming the other gas barrier layer include, but are not necessarily limited to, EVOH, polyamides, polyesters, polyvinylidene chloride, acrylonitrile copolymers, polyvinylidene fluoride, polychlorotrifluoroethylene, polyvinyl alcohol, and inorganic vapor-deposited bodies (e.g., obtained by vapor-depositing, on a predetermined base material, an inorganic substance such as aluminum, tin, indium, nickel, titanium, chromium, a metal oxide, a metal nitride, a metal oxynitride, a metal carbonitride). Among these, EVOH is preferable in terms of melt moldability and gas barrier properties. When the layer structure of the present invention includes another gas barrier layer, the thickness of the other gas barrier layer is not particularly limited, and a person skilled in the art may select any thickness as long as the actions and effects of the gas barrier layer formed from the melt-molded body of the resin pellet group are not impaired.

In addition to the gas barrier layer, the layer structure of the present invention may include a thermoplastic resin layer.

From the viewpoint of improving the impact resistance, the number of thermoplastic resin layers in the layer structure of the present invention is preferably one or more, and more preferably two or more. The number of thermoplastic resin layers may be 13 or less. Note that, when the layer structure includes a plurality of thermoplastic resin layers, the materials forming the layers may be the same or different.

The thermoplastic resin layer contains a thermoplastic resin as a main component. The thermoplastic resin layer may contain, as a main component, a single kind of thermoplastic resin or a mixture of a plurality of kinds of thermoplastic resins. The proportion of the thermoplastic resin in the thermoplastic resin layer is preferably 80 mass % or more, more preferably 90 mass % or more, and even more preferably 99 mass % or more, and the thermoplastic resin layer may essentially consist only of the thermoplastic resin. The stretchability and thermoformability of the layer structure of the present invention can be improved by stacking the thermoplastic resin layer containing a thermoplastic resin as a main component.

The average thickness of a single thermoplastic resin layer is preferably 10 µm or more, and more preferably 20 µm or more. The average thickness of a single thermoplastic resin layer may be 1000 µm or less, 500 µm or less, or 400 µm or less. When the average thickness of a single thermoplastic resin layer is 10 µm or more, the thickness can be easily adjusted when the thermoplastic resin layers are stacked, and it is thus possible to further increase the durability of the layer structure. When the average thickness of a single thermoplastic resin layer is 1000 µm or less, favorable thermoformability tends to be achieved.

The thermoplastic resin that forms the thermoplastic resin layer is not particularly limited as long as the thermoplastic resin is softened and exhibits plasticity when heated to a glass transition temperature or melting point, and examples thereof include polyolefin resins (e.g., polyethylene resins and polypropylene resins), grafted polyolefin resins obtained through graft modification with an unsaturated carboxylic acid or an ester thereof, halogenated polyolefin resins, ethylene-vinyl acetate copolymer resins, ethylene-acrylic acid copolymer resins, ethylene-acrylic acid ester copolymer resins, polyester resins, polyamide resins, polyvinyl chloride resins, polyvinylidene chloride resins, acrylic resins, polystyrene resins, vinyl ester resins, ionomers, polyester elastomers, polyurethane elastomers, and aromatic or aliphatic polyketones. In particular, polyolefin resins are preferable because of their favorable mechanical strength and moldability, and polyethylene resins and polypropylene resins are more preferable.

The thermoplastic resin layer may contain an additive as long as the object of the present invention is not impaired. Examples of the additive include resins other than the above-described thermoplastic resins, heat stabilizers, ultraviolet absorbers, antioxidants, colorants, and fillers. When the thermoplastic resin layer contains an additive, the content of the additive is preferably 20 mass % or less, more preferably 10 mass % or less, and even more preferably 5 mass % or less, relative to the total amount of the thermoplastic resin layer.

In the layer structure of the present invention, it is preferable that the thermoplastic resin layer is disposed on at least one side of the gas barrier layer. Here, the expression "disposed on at least one side" encompasses both a state in which the thermoplastic resin layer is stacked on the gas barrier layer in direct contact therewith, and a state in which the thermoplastic resin layer is stacked on the gas barrier layer with another layer (e.g., a commonly used adhesion layer) interposed therebetween. When the thermoplastic resin layer is disposed in this manner, the mechanical strength tends to be increased.

Also, it is preferable that the layer structure of the present invention includes a coextruded structure of the gas barrier layer and the thermoplastic resin. The term "coextruded structure of the gas barrier layer and the thermoplastic resin" used in the present specification refers to a stacked structure formed by co-extrusion of the gas barrier layer and the thermoplastic resin layer. When the layer structure includes such a coextruded structure, the mechanical strength tends to be increased.

Furthermore, the layer structure of the present invention may include at least one adhesion layer. The adhesion layer may be disposed between the gas barrier layer and the thermoplastic resin layer, for example. The number of adhesion layers included in the layer structure is not particularly limited. When the layer structure of the present invention includes the adhesion layer, it is possible to increase the interlayer adhesion between the gas barrier layer and the thermoplastic resin layer. When the layer structure of the present invention includes a plurality of adhesion layers, the materials forming the layers may be the same or different.

A known adhesive resin can be used as a material forming the adhesion layer. The material forming the adhesion layer may be selected as appropriate by a person skilled in the art according to the production method of the layer structure.

For example, when the layer structure of the present invention is produced using a lamination method, it is possible to form the adhesion layer using, for example, a two-component polyurethane-based adhesive in which a polyisocyanate component and a polyol component are mixed and reacted. Also, it is possible to further improve the adhesion by adding a small amount of an additive such as a known silane coupling agent to the adhesion layer.

Alternatively, when the layer structure of the present invention is produced using a co-extrusion molding method, the material used for the adhesion layer is not particularly limited as long as the material has adhesion to the gas barrier layer and the thermoplastic resin layer. For example, it is possible to use an adhesive resin containing a carboxylic acid-modified polyolefin. A modified olefin-based polymer containing a carboxyl group obtained by chemically (e.g., through addition reaction or graft reaction) bonding ethylenically unsaturated carboxylic acid, an ester thereof, or an anhydride thereof to an olefin-based polymer can be suitably used as the carboxylic acid-modified polyolefin. Here, examples of the olefin-based polymer include polyolefins such as polyethylene (e.g., low-pressure polyethylene, medium-pressure polyethylene, and high-pressure polyethylene), linear low-density polyethylene, polypropylene, and polybutene, and copolymers of an olefin and another monomer (e.g., vinyl ester or unsaturated carboxylic acid ester) such as an ethylene-vinyl acetate copolymer and an ethylene-acrylic acid ethyl ester copolymer. A linear low-density polyethylene, an ethylene-vinyl acetate copolymer (with a vinyl acetate content of 5 to 55 mass %), and an ethylene-acrylic acid ethyl ester copolymer (with an acrylic acid ethyl ester content of 8 to 35 mass %) are preferable, and the linear low-density polyethylene and the ethylene-vinyl acetate copolymer are particularly preferable. Examples of ethylenically unsaturated carboxylic acid, an ester thereof, or an anhydride thereof include ethylenically unsaturated monocarboxylic acid or an ester thereof, and ethylenically unsaturated dicarboxylic acid, or a monoester or diester thereof or an anhydride thereof. Among these, ethylenically unsaturated dicarboxylic anhydride is preferable. Specific examples thereof include maleic acid, fumaric acid, itaconic acid, maleic anhydride, itaconic anhydride, maleic acid monomethyl ester, maleic acid monoethyl ester, maleic acid diethyl ester, and fumaric acid monomethyl ester, and maleic anhydride is particularly preferable.

The addition amount or the yield of grafting (degree of modification) of the ethylenically unsaturated carboxylic acid or the anhydride thereof to the olefin-based polymer is preferably 0.0001 mass % to 15 mass %, and preferably 0.001 mass % to 10 mass %, relative to the olefin-based polymer. The addition reaction or graft reaction of the ethylenically unsaturated carboxylic acid or the anhydride thereof with the olefin-based polymer can be performed using a radical polymerization method or the like in the presence of a solvent (e.g., xylene) and a catalyst (e.g., a peroxide), for example. The thus-obtained carboxylic acid-modified polyolefin has a melt flow rate (MFR) of preferably 0.2 g/10 min to 30 g/10 min, and more preferably 0.5 g/10 min to 10 g/10 min at 210° C. under a load of 2160 g, as measured in accordance with JIS K 7210:2014. These adhesive resins may be used alone or as a mixture of two or more.

The stacking order of the layer structure of the present invention is not particularly limited, and examples thereof include T/E/T, E/Ad/T, and T/Ad/E/Ad/T where E represents the gas barrier layer, Ad represents the adhesion layer, and T represents the thermoplastic resin layer. Each of the layers constituting the layer structure may be composed of a single layer or multiple layers. From the viewpoint of increasing the impact resistance, it is preferable that the layer structure includes a thermoplastic resin layer as the outermost layer.

When the layer structure of the present invention is a multilayer structure, the layer structure can be produced using a known method such as a co-extrusion molding method, a co-injection molding method, an extrusion lamination method, and a dry lamination method. Examples of the co-extrusion molding method include a co-extrusion lamination method, a co-extrusion sheet forming method, a co-extrusion inflation molding method, and a co-extrusion blow molding method. Examples of the layer structures obtained using such methods include sheets, films, and parisons.

The layer structure of the present invention has excellent gas barrier properties, as well as linear cuttability in both the MD direction and the TD direction. Here, the term "linear cuttability" used in the present specification is also called straight cuttability or increased cuttability, which refers to the following property: when a predetermined notch is formed in an end portion of a layer structure in the form of a sheet or a film, for example, and the two end portions separated by the notch are spread apart so as to be torn apart in the thickness direction, the layer structure can be linearly cut along the notch. Specifically, this property can be evaluated using the methods described in the examples. The linear cuttability is one property that represents the increased openability of a closable container or packaging material produced using the above-described layer structure.

(Applications)

A sheet, film, parison, or the like of the layer structure of the present invention is reheated at a temperature lower than or equal to the melting point of the resin contained in the multilayer structure, and is uniaxially or biaxially stretched according to a thermoforming method such as draw forming, a roll stretching method, a pantograph stretching method, an inflation stretching method, or a blow molding method, whereby a desired stretched multilayer structure can be obtained.

A container produced using a thermoforming method can be formed by softening a multilayer body of films, sheets, or the like through heating, and thereafter molding the multilayer body into a mold shape. Examples of the thermoforming method include methods of molding to a mold shape using vacuum or compressed air, and also using a plug as needed (e.g., straight forming, drape forming, air slip forming, snap back forming, and plug assist forming), and press forming methods. Various molding conditions such as the molding temperature, the degree of vacuum, the pressure of compressed air, and the rate of molding can be set appropriately according to the plug shape, the mold shape, and the properties or the like of a raw material film or sheet. The molding temperature is not particularly limited as long as it is a temperature at which a resin can be softened to a degree sufficient enough to be molded, and a suitable range of the molding temperature varies depending on the configuration of the multilayer body of films, sheets, or the like.

In the case of thermoforming a film, it is desirable that the film temperature is not too high to cause melting of the film under heating, or to transfer projections and recesses on a metal surface of a heater plate onto the film, and is not too low to cause insufficient shaping. A specific example of the lower limit of the film temperature is usually 50° C., preferably 60° C., and more preferably 70° C. The upper limit of the film temperature is usually 120° C., preferably 110° C., and more preferably 100° C.

On the other hand, in the case of thermoforming a sheet, the sheet may be molded at a temperature higher than that in the case of a film. The lower limit of the sheet temperature in this case is 130° C., for example. The upper limit of the sheet temperature is 180° C., for example.

The layer structure of the present invention may also be used as a packaging material or a container for packaging or housing predetermined content, for example. Examples of the content include food (e.g., fresh food, processed food, refrigerated food, frozen food, freeze-dry food, ready-prepared food, and half-cooked food); beverages (e.g., drinking water, tea drinks, milk beverages, processed milk, soy milk, coffee, cocoa, soft drinks, soup, alcoholic beverages (e.g., beer, wine, white distilled liquor, Japanese sake, whiskey, and brandy); pet food (e.g., dog food and cat food); fodder or feed for livestock, domestic fowls, farmed fish; fats and oils (e.g., cooking oil and industrial oil); pharmaceuticals (e.g., pharmaceuticals for pharmacies, pharmaceuticals requiring guidance, OTC pharmaceuticals, and animal pharmaceuticals); and other medicines.

EXAMPLES

Hereinafter, the present invention will be described in detail by way of examples; however, the present invention is not limited to these examples.

Evaluation Methods (1) Ethylene Unit Content and Saponification Degree

EVOH pellets obtained in the production examples were dissolved in DMSO-d6, then subjected to $^1$H-NMR measurement (JNM-GX-500 Model, manufactured by JEOL Ltd), to measure the ethylene unit content and the saponification degree of the EVOH constituting the pellets.

(2) Quantitative Determination of Sodium Ions, Phosphoric Acid, and Boric Acid

In a Teflon (registered trademark) pressure container, 0.5 g of the EVOH pellets obtained in the production examples were placed, and 5 mL of concentrated nitric acid was added thereto for decomposition at room temperature for 30 minutes. After 30 minutes had elapsed, the lid was closed, and decomposition was carried out through heating at 150° C. for 10 minutes, and subsequently at 180° C. for 5 minutes, using a wet digestion system (MWS-2 manufactured by Actac Corp.), followed by cooling to room temperature. The processing solution was transferred to a 50 mL volumetric flask (manufactured by TPX (registered trademark)), which was then filled with pure water. The resulting solution was subjected to analysis of contained metal using an ICP emission spectrophotometer ("OPTIMA 4300 DV" manufactured by PerkinElmer, Inc.), to calculate each of the amount of sodium ions (elemental sodium), the amount of phosphoric acid in terms of phosphoric acid radicals, and the boric acid content. Note that a calibration curve created using a commercially available standard solution was used for the quantitative determination of each component.

(3) Acetic Acid Content

In 100 ml of ion exchanged water, 20 g of the EVOH pellets obtained in the production examples was placed, and then subjected to extraction under heating at 95° C. for 6 hours. The extract was subjected to neutralization titration with 1/50 N NaOH using phenolphthalein as an indicator, and the acetic acid content was quantitatively determined. Note that the phosphoric acid content was taken into account when calculating the acetic acid content.

(4) Melt Tension

Melt tensions yielded at a take-up speed of 50 m/mini or 80 m/min of the EVOH pellets obtained in the production examples were measured using a CAPILOGRAPH 1D manufactured by Toyo Seiki Seisaku-sho, Ltd., under the conditions of a measurement temperature of 210° C., a capillary diameter of 1 mm, a length of 10 mm, and a piston speed of 1 mm/min.

(5) Average Particle Size

Monolayer films having a thickness of 100 μm obtained in the examples and comparative examples were each cut in the TD direction, the exposed TD cross section was immersed in a solvent at 60° C. for 10 seconds, and the cut surface was observed using a scanning electron microscope (S-3000N, manufactured by Hitachi, Ltd.). Using new-generation image analysis software (Image Pro Plus 7.0 manufactured by Hakuto Co., Ltd.), 100 dispersion phases (particles) within the observed unit field of view (9 μm×12 μm) were extracted in descending order of particle size, and the average particle size was calculated. At this time, the size of a particle was regarded as a circle-equivalent diameter, which is the diameter of a circle having the same area as the particle, and the average particle size was calculated from the number of particles and the particle sizes thereof. Note that, as the above-described solvent, methanol was used in Examples 1 to 5 and Comparative Examples 1 to 4, and a solvent mixture of water/methanol=30/70 (volume ratio) was used in Example 6. The phases having a high ethylene unit content (44 mol % and 48 mol %) were dissolved in methanol. The phases having a low ethylene unit content (35 mol %) can be dissolved by increasing the proportion of water (water/methanol) by adding water thereto. Accordingly, the average particle size can be measured by selecting an appropriate solvent according to the kinds of the matrix phase and the dispersion phase.

(6) Linear Cuttability

Figure 1:
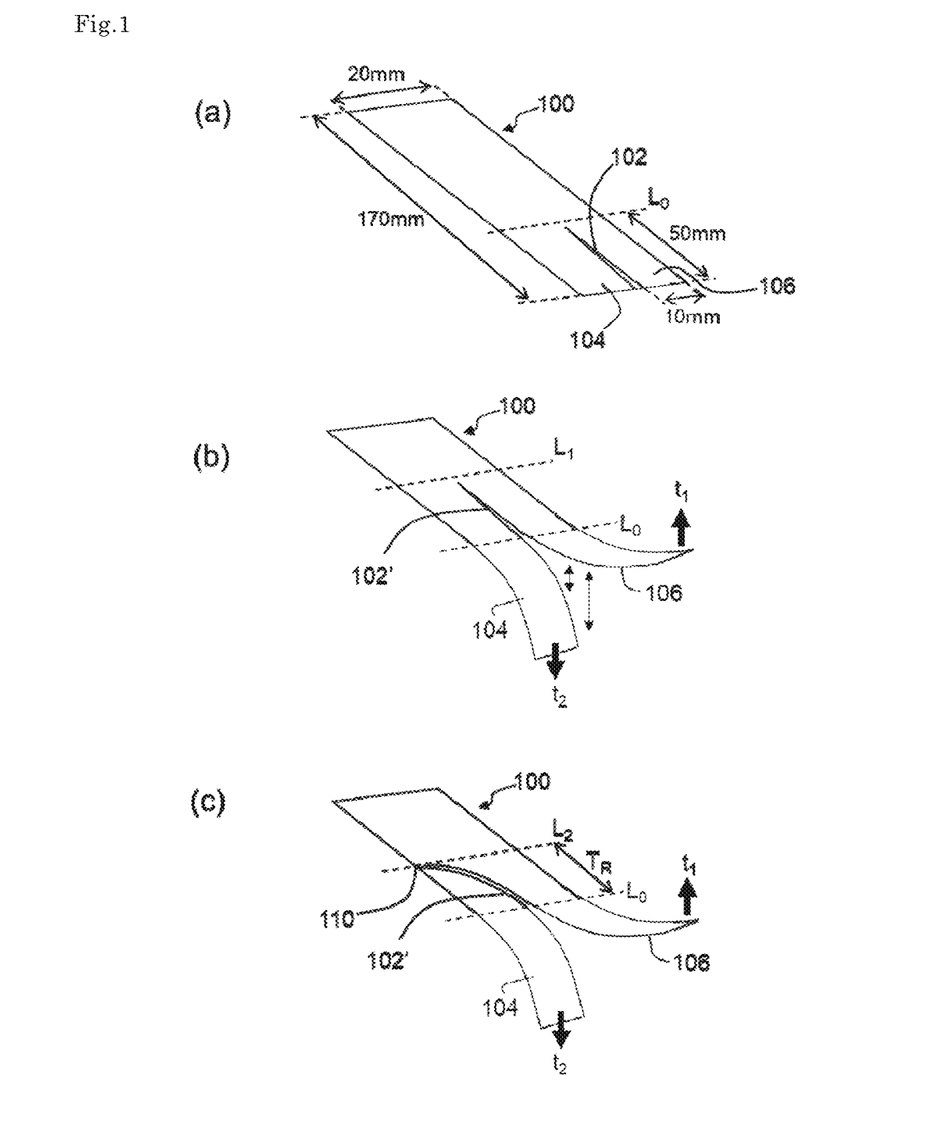

Monolayer films having a thickness of 100 μm obtained in the examples and comparative examples were each subjected to humidity control at a temperature of 23° C. and a relative humidity of 50% RH, and thereafter, 10 samples 100 having a length of 170 mm in the longitudinal direction and a length of 20 mm in the lateral direction as shown in FIG. 1(*a*) were cut out therefrom. A notch 102 having a length of 50 mm in the longitudinal direction and corresponding to a reference line $L_0$ was formed in each of the ten cut-out samples 100 at a position at 0 mm in the longitudinal direction and 10 mm in the lateral direction from an end portion thereof. Thereafter, using an autograph "DCS-50M Model tensile tester" manufactured by SHIMADZU CORPORATION, a tensile test was performed by tearing the sample 100 by expanding a notch 102' between cut pieces 104 and 106 in the thickness direction of the sample 100 as shown in FIG. 1(*b*) under the following conditions. The conditions for the tensile test were as follows. When measuring the linear cuttability in the MD direction, each of the 10 samples 100 was cut out such that the MD direction thereof extended in the longitudinal direction. When measuring the linear cuttability in the TD direction, each of the 10 samples 100 was cut out such that the TD direction thereof extended in the longitudinal direction.

(Tensile Test Conditions)
Temperature: 23° C.
Humidity: 50% RH
Tensile distance: 100 mm
Tensile speed: 250 m m/min
Mode: T-peel mode In this test, when the linear cuttability is high, the notch 102' extends in the longitudinal direction (FIG. 1(*b*)). When the linear cuttability is low, the notch 102' is displaced in the lateral direction to reach a point 110 at one end of the sample 100 in the lateral direction, whereby the sample breaks (FIG. 1(*c*)). The proportion of the samples 100 that partially broke, and a distance $T_R$ (FIG. 1(*c*)) from the reference line $L_0$ of the sample 100 to a breakage position (a breakage stop line $L_2$) at which the samples 100 broke were measured, and the linear cuttability was evaluated. When there were a plurality of broken samples 100, the distance to the breakage position was calculated as an average value. When no sample 100 broke (e.g., a case where the notch 102' extended to a stop line $L_1$ as shown in FIG. 1(*b*)), the result was indicated as "-".

(7) Oxygen Transmission Rate (OTR)

The oxygen transmission rates of monolayer films having a thickness of 20 μm obtained in the examples and comparative examples were measured using an oxygen transmission measurement apparatus "OX-TRAN 2/20 Model" (a detection limit value 0.01 cc·20 μm/(m²·day·atm)) manufactured by MOCON Inc., under the conditions of a temperature of 20° C. and a humidity of 65% RH in accordance with a method described in JIS K 7126 (isopiestic method).

(8) Recyclability

Using a Labo Plastomill "20R200" (twin screw counter-rotating) manufactured by Toyo Seiki Seisaku-sho, Ltd., 60 g of each of the resin pellet groups contained in the examples and comparative examples was kneaded at 100 rpm and 250° C., and the change in the motor torque during kneading was measured. The motor torque was measured 5 minutes after the start of kneading, and the time required for the torque value to reach a value 1.5 times the value of the above-described torque obtained 5 minutes after the start of kneading was evaluated. It is indicated that the longer this time is, the better the recyclability is. From the obtained time, the recyclability of the resin pellet group was classified in accordance with the following determination criteria.

(Determination Criteria)
A: 60 minutes or more
B: 45 minutes or more and less than 60 minutes
C: Less than 45 minutes Production Example 1: Production of EVOH (A1-1) Pellets In a 200 L pressurized reaction tank provided with a jacket, a stirrer, a nitrogen inlet, an ethylene inlet, and an initiator addition port, 75.0 kg of vinyl acetate (hereinafter may be referred to as VAc), and 7.2 kg of methanol (hereinafter may be referred to as MeOH) were charged, and the inside of the reaction tank was purged with a nitrogen gas through nitrogen bubbling for 30 minutes. Then, after the temperature inside the reaction tank had been adjusted to 65° C., ethylene was introduced such that the reaction tank pressure (ethylene pressure) was 4.13 MPa, and 9.4 g of 2,2'-azobis(2,4-dimethylvaleronitrile) ("V-65" manufactured by FUJIFILM Wako Pure Chemical Corporation) was added thereto as an initiator, to initiate polymerization. During polymerization, the ethylene pressure was kept at 4.13 MPa, and the polymerization temperature at 65° C. Four hours later, after confirming that the VAc conversion ratio (polymerization rate in terms of VAc) had reached 49.7%, cooling was performed, and a MeOH solution in which 37.5 g of sorbic acid was dissolved in 25 kg methanol was placed in the reaction tank to terminate the polymerization. The reaction tank was opened to allow ethylene to escape, followed by nitrogen gas bubbling to complete deethylation. Then, the polymerized solution was extracted from the reaction tank, and diluted with 20 L of MeOH. This diluted solution was fed from the top of the column of a column-type container, and MeOH vapor was fed from the bottom of the column to remove unreacted monomers remaining in the polymerized solution together with MeOH vapor, to obtain a MeOH solution of an ethylene-vinyl acetate copolymer (hereinafter may be referred to as EVAc).

Then, 100 kg of a MeOH solution containing EVAc in a proportion of 20 mass % was charged in a 300 L reaction tank provided with a jacket, a stirrer, a nitrogen inlet, a reflux condenser, and a solution addition port. While blowing nitrogen gas into the solution, the temperature was raised to 60° C., and a MeOH solution whose sodium hydroxide concentration had been adjusted to 2 N was added for two hours at a rate of 300 mL/min. After the addition of the MeOH solution containing sodium hydroxide was complete, a saponification reaction was allowed to proceed through stirring for 2 hours, while keeping the temperature in the system at 60° C. and allowing MeOH and methyl acetate produced by the saponification reaction to flow out of the reaction tank. Thereafter, 5.8 kg of acetic acid was added thereto to terminate the saponification reaction.

Thereafter, while stirring under heating at 80° C., 75 L of ion exchanged water was added to cause MeOH to flow out of the reaction tank and to precipitate EVOH. The precipitated EVOH was collected through decantation and ground with a grinder. The resulting EVOH powder was placed in a 1 g/L aqueous acetic acid solution (bath ratio 20: corresponding to a ratio of 20 L of the aqueous solution to 1 kg of the powder), and stirred and washed for 2 hours. The resulting powder was deliquified, then further placed in a 1 g/L aqueous acetic acid solution (bath ratio 20), and stirred and washed for 2 hours. The resultant was deliquified again, then placed in ion exchanged water (bath ratio 20), and stirred and washed for 2 hours for deliquification. This series of operations was repeated three times to perform purification. Then, the resultant was stirred and immersed for 4 hours in 250 L of an aqueous solution containing acetic acid at 0.5 g/L and sodium acetate at 0.1 g/L, and thereafter deliquified. The resultant was dried for 16 hours at 60° C., thereby obtaining 10.1 kg of a roughly dried EVOH. The above-described series of operations was performed again to obtain 10.2 kg of a roughly dried EVOH, thereby obtaining a total of 20.3 kg of a roughly dried EVOH (A1-1).

In a 60 L stirring tank provided with a jacket, a stirrer, and a reflux condenser, 20 kg of the roughly dried EVOH (A1-1) obtained as above, 8 kg of water, and 22 kg of MeOH were charged, and stirred for 5 hours at 60° C. for complete dissolution, thus obtaining a resin composition solution. This solution was extruded, through a metal plate having a diameter of 4 mm, in a liquid mixture of water/MeOH=90/10 (volume ratio) cooled to −5° C. so as to be precipitated in the form of a strand. This strand was cut into pellets using a strand cutter, thereby obtaining EVOH hydrous pellets. The moisture content of the obtained EVOH hydrous pellets was 52 mass %, as measured using a halogen moisture meter "HR73" manufactured by Mettler Co. Ltd. The obtained EVOH hydrous pellets were placed in a 1 g/L aqueous acetic acid solution (bath ratio 20), and stirred and washed for 2 hours. The resulting pellets were deliquified, further placed in a 1 g/L aqueous acetic acid solution (bath ratio 20), and stirred and washed for 2 hours. After deliquification, the aqueous acetic acid solution was renewed, and the same operation was performed. The pellets resulting from deliquification after washing using the aqueous acetic acid solution was placed in ion exchanged water (bath ratio 20), and stirred and washed for 2 hours for deliquification. This series of operations was repeated three times. Thus, EVOH hydrous pellets from which the catalyst residue from the saponification reaction had been removed were obtained.

The obtained hydrous pellets were placed in an aqueous solution (bath ratio 20) having a sodium acetate concentration of 0.510 g/L, an acetic acid concentration of 0.8 g/L, and a phosphoric acid concentration of 0.04 g/L, and immersed, with periodic stirring, for 4 hours to perform chemical treatment. The pellets were deliquified, and dried under a stream of nitrogen having an oxygen concentration of 1 vol % or less for 3 hours at 80° C., and 16 hours at 105° C., to obtain columnar EVOH (A1-1) pellets (moisture content 0.3%) containing acetic acid, sodium ions (sodium salt), and phosphoric acid and having an average diameter of 2.8 mm and an average length of 3.2 mm. The polymerization conditions and saponification conditions for the EVOH of the EVOH (A1-1) pellets obtained in the present production example are shown in Table 1.

Production Examples 2 to 4: Production of EVOH (A1-2) Pellets, EVOH (A1-3) Pellets, and EVOH (A2-1) Pellets EVOH (A1-2) pellets, EVOH (A1-3) pellets, and EVOH (A2-1) pellets were produced in the same manner as in Example 1 except that the polymerization conditions and saponification conditions for the EVOH were changed as described in Table 1, and that the composition of the aqueous solution (bath ratio 20) used for the chemical treatment of the EVOH hydrous pellets was changed to a composition having a sodium acetate concentration of 0.510 g/L, an acetic acid of 0.8 g/L, a phosphoric acid concentration of 0.04 g/L, and a boric acid concentration of 0.57 g/L.

Production Examples 5 and 6: Production of EVOH (A2-2) Pellets and EVOH (A2-3) Pellets EVOH (A2-2) pellets and EVOH (A2-3) pellets were produced in the same manner as in Example 1 except that the polymerization conditions and the saponification conditions for the EVOH were changed as described in Table 1.

The ethylene unit content, saponification degree, sodium ion amount, phosphoric acid amount, boric acid amount, acetic acid amount, and melt tension of the obtained EVOH (A1-1) pellets to EVOH (A1-2) pellets, and EVOH (A2-1) pellets to EVOH (A2-3) pellets were measured in accordance with the methods described in the evaluation methods (1) to (4) above. The obtained results are shown in Table 2. Note that, for all of the EVOH pellets, the sodium ion content was 100 ppm, the phosphoric acid content was 40 ppm in terms of phosphoric acid radicals, and the acetic acid content was 100 ppm evaluated in accordance with the methods described in the evaluation methods (5) to (7) above. The results are shown in Table 3.

TABLE 1

|  | Production Example 1 | Production Example 2 | Production Example 3 | Production Example 4 | Production Example 5 | Production Example 6 |
|---|---|---|---|---|---|---|
| Name of Pellet | EVOH(A1-1) | EVOH(A1-2) | EVOH(A1-3) | EVOH(A2-1) | EVOH(A2-2) | EVOH(A2-3) |
| Pressurized Reaction Tank(L) | 200 | 100 | 100 | 100 | 100 | 100 |
| VAc (kg) | 75.0 | 40.0 | 40.0 | 40.0 | 40.0 | 40.0 |
| MeOH (kg) | 7.2 | 17.4 | 3.6 | 6.8 | 1.9 | 14.14 |
| Ethylene Pressure (MPa) | 4.13 | 2.87 | 5.7 | 5.97 | 5.84 | 3.95 |
| Polymerization Initiator | Initiator 1 | Initiator 1 | Initiator 1 | Initiator 1 | Initiator 1 | Initiator 1 |
| Polymerization Initiator Content (g) | 9.4 | 13.2 | 9.6 | 23.2 | 9.2 | 13.6 |
| Temperature in Reaction Tank (° C.) | 65 | 60 | 65 | 60 | 65 | 60 |
| Reaction Time (hr) | 4 | 3 | 4 | 4 | 4 | 4 |
| VAc Conversion Ratio (%) | 49.7 | 44.9 | 54.8 | 54.7 | 55.2 | 49.8 |
| Charge Amount for Saponification (kg) | 150 | 100 | 100 | 100 | 100 | 100 |
| Addition Rate of NaOH/MeOH Solution (mL/min) | 450 | 300 | 300 | 300 | 300 | 300 |

Initiator 1: 2,2'-azobis(2,4-dimethylvaleronitrile) ("V-65" manufactured by FUJIFILM Wako Pure Chemical Corporation)

TABLE 2

|  | Name of Pellet | Ethylene Unit Content (mol %) | Saponification Degree (mol %) | Melt Tension (50 m/min) | Melt Tension (80 m/min) | Boric Acid Content (ppm) |
|---|---|---|---|---|---|---|
| Production Example 1 | EVOH(A1-1) | 32.12 | 99.78 | 12 | 14 | 0 |
| Production Example 2 | EVOH(A1-2) | 27.32 | 99.85 | 11 | 13 | 800 |
| Production Example 3 | EVOH(A1-3) | 44.28 | 99.98 | 24 | — | 800 |
| Production Example 4 | EVOH(A2-1) | 47.88 | 99.99 | 8 | 9 | 800 |
| Production Example 5 | EVOH(A2-2) | 43.98 | 99.89 | 6 | 6 | 0 |
| Production Example 6 | EVOH(A2-3) | 34.97 | 99.99 | 2 | 4 | 0 |

Example 1: Production and Evaluation of Resin Pellet Group and Monolayer Film 85 parts by mass of the EVOH (A1-1) pellets produced in Production Example 1 and 15 parts by mass of the EVOH (A2-1) pellets produced in Production Example 4 were dry-blended to produce a resin pellet group. The recyclability of the obtained resin pellet group was evaluated in accordance with the method described in the evaluation method (8) above. The results are shown in Table 3.

Furthermore, using this resin pellet group, a 100 μm monolayer film was produced using a single screw extruder (manufactured by Research Laboratory of Plastics Technology Co., Ltd., GT-40-A, D (mm)=40, L/D=26, compression ratio=3.0, screw: full flighted). The extrusion conditions were as follows.

Extrusion temperature: C1/C2/C3/AD/H1/Die=180/200/220/220/220/220 (° C.)
Die width: 550 mm
Screw rotation rate: 90 rpm
Take-up roll temperature: 80° C.
Take-up roll speed: 6.0 m/min In addition, a monolayer film having a thickness of 20 μm was produced by changing the take-up roll speed to 30 m/min in the film-forming conditions for the above-described 100 μm monolayer film.

Using the obtained monolayer film, an average particle size, linear cuttability, and an oxygen transmission rate were

Examples 2 to 6, and Comparative Examples 2 and 3: Production and Evaluation of Resin Pellet Groups and Monolayer Films Resin pellet groups and monolayer films were produced and evaluated in the same manner as in Example 1 except that the kinds and blending amount of predetermined pellets were changed as described in Table 3 from the EVOH (A1-1) pellets to EVOH (A1-3) pellets, and the EVOH (A2-1) pellets to the EVOH (A2-3) pellets obtained in Production Examples 1 to 6. The results are shown in Table 3.

Examples 7 and 8: Production and Evaluation of Resin Pellet Groups and Monolayer Films The blending amounts of the EVOH (A1-1) pellets obtained in Production Example 1 and the EVOH (A2-1) pellets obtained in Production Example 4 were selected as described in Table 3, and another component "PA6" (nylon 6 "SF1018A" manufactured by Ube Industries, Ltd.) was simultaneously dry-blended in each of the blending amounts described in Table 3, to produce resin pellet groups, and the resin pellet groups were evaluated. Monolayer films were produced and evaluated in the same manner as in Example 1 except that the aforementioned resin pellet groups were used. The results are shown in Table 3.

Comparative Example 1: Production and Evaluation of Resin Pellet Group and Monolayer Film 85 parts by mass of the EVOH (A1-1) pellets obtained in Production Example 1 and 15 parts by mass of the EVOH (A2-1) pellets obtained in Production Example 4 were dry-blended, and melt-kneaded under the extrusion conditions shown below, thereby producing melt-kneaded pellets. The recyclability was evaluated in the same manner as in Example 1 except that the melt-kneaded pellets were used. Additionally, a monolayer film was produced and evaluated in the same manner as in Example 1 except that the melt-kneaded pellets were used. The results are shown in Table 3.

(Extrusion Conditions)

Extruder: Twin-screw extruder "Labo Plastomill" manufactured by Toyo Seiki Seisaku-sho, Ltd.

Screw diameter: 25 mm

Screw rotation rate: 100 rpm

Feeder rotation rate: 80 rpm

Cylinder, die temperature setting: C1/C2/C3/C4/C5/Die=180/210/220/220/220/220 (° C.)

Comparative Example 4: Production and Evaluation of Resin Pellet Group and Monolayer Film Melt-kneaded pellets were produced in the same manner as in Comparative Example 1 except that 80 parts by mass of the EVOH (A1-2) pellets obtained in Production Example 2 and 20 parts by mass of the EVOH (A2-2) pellets obtained in Production Example 5 were used, and the recyclability of the melt-kneaded pellets was evaluated. Additionally, a monolayer film was produced and evaluated in the same manner as in Example 1 except that the aforementioned melt-kneaded pellets were used. The results are shown in Table 3.

TABLE 3

| Resin Pellet Group | | | Example 1 | Example 2 | Example 3 | Example 4 | Example 5 | Example 6 | Example 7 | Example 8 | Comparative Example 1 | Comparative Example 2 | Comparative Example 3 | Comparative Example 4 |
|---|---|---|---|---|---|---|---|---|---|---|---|---|---|---|
| Pellet (A1) | Name of Pellet (EVOH) | | A1-1 | A1-1 | A1-1 | A1-2 | A1-1 | A1-3 | A1-1 | A1-1 | A1-1 | A1-1 A1-3 | — | A1-2 |
| | Ethylene Unit Content | mol % | 32 | 32 | 32 | 27 | 32 | 44 | 32 | 32 | 32 | 32  44 | — | 27 |
| | Melt Tension (50 m/min) | mN | 12 | 12 | 12 | 11 | 12 | 24 | 12 | 12 | 12 | 12  24 | — | 11 |
| | Melt Tension (80 m/min) | mN | 34 | 14 | 14 | 13 | 14 | — | 14 | 14 | 14 | 14  — | — | 13 |
| | MFR | g/10 min | 3.8 | 3.8 | 3.8 | 4.0 | 3.8 | 3.3 | 3.8 | 3.8 | 3.8 | 3.8  3.3 | — | 4.0 |
| | Blending Amount | mass % | 85 | 60 | 95 | 85 | 85 | 85 | 82.5 | 76.5 | 85 | 85  15 | — | 85 |
| Pellet (A2) | Name of Pellet (EVOH) | | A2-1 | A2-1 | A2-1 | A2-2 | A2-2 | A2-3 | A2-1 | A2-1 | A2-1 | — | A2-3 A2-1 | A2-2 |
| | Ethylene Unit Content | mol % | 48 | 48 | 48 | 44 | 44 | 35 | 48 | 48 | 48 | — | 35  48 | 44 |
| | Melt Tension (50 m/min) | mN | 8 | 8 | 8 | 6 | 6 | 2 | 8 | 3 | 8 | — | 2  8 | 6 |
| | Melt Tension (80 m/min) | mN | 9 | 9 | 9 | 6 | 6 | 4 | 9 | 9 | 9 | — | 4  9 | 6 |
| | MFR | g/10 min | 15 | 15 | 15 | 13 | 13 | 21 | 15 | 15 | 15 | — | 21  15 | 13 |
| | Blending Amount | mass % | 15 | 40 | 5 | 15 | 15 | 15 | 14.5 | 13.5 | 15 | 12 | 85  15 | 15 |
| Ethylene Content Difference between A1 and A2 | | mol % | 16 | 16 | 16 | 17 | 12 | 9 | 16 | 16 | 16 | 12 | 13 | 17 |
| Another Component | Name | | — | — | — | — | — | — | PA6 | PA6 | — | — | — | — |
| | Blending Amount | mass % | — | — | — | — | — | — | 3 | 10 | — | — | — | — |
| Whether Monolayer Film was Molded using Melt-Kneaded Pellets | | | No[1] | No[1] | No[1] | No[1] | No[1] | No[1] | No[1] | No[1] | Yes[2] | No[1] | No[1] | Yes[2] |
| Evaluation | Average Particle Size | nm | 284 | 302 | 246 | 272 | 265 | 254 | 295 | 303 | 146 | 114 | 106 | 132 |
| Linear Cuttability | MD Distance of Breakage | cm | 0 | 0 | 0 | 0 | 0 | 0 | 0 | 0 | 0 | 0 | 0 | 0 |
| | Percentage of Broken | % | 4.5 | 4.7 | 4.4 | 4.4 | 4.6 | 4.3 | 4.4 | 4.5 | 4.1 | 3.8 | 3.7 | 4.2 |
| | TD Distance of Breakage | cm | 20 | 10 | 30 | 20 | 20 | 40 | 20 | 20 | 80 | 80 | 80 | 80 |
| | Percentage of Broken | % | 0.4 | 1.0 | 0.3 | 0.2 | 0.3 | 1.5 | 0.5 | 0.8 | 0.4 | 0.3 | 0.7 | 0.2 |
| OTR | | cc·20 μm/m²·day·atm | 0.4 | 1.0 | 0.3 | 0.2 | 0.3 | 1.5 | 0.5 | 0.8 | 0.4 | 0.3 | 0.7 | 0.2 |
| Recyclability | | | A | A | A | A | A | A | B | C | A | A | A | A |

[1] A monolayer film was molded by melting and kneading a group of resin pellets as they were, without going through melt-kneaded pellets.
[2] A group of resin pellets was melt-kneaded to produce pellets (melt-kneaded pellets), which were then melt-kneaded to form a monolayer film.

As is clear from Table 3, the results of Examples 1 to 3 indicate that the monolayer films obtained by directly melt-molding the resin pellet groups including the pellet (A1) or the pellet (A2) had excellent linear cuttability. Also, the results of Example 4 and Example 5 indicate that the obtained monolayer films had excellent linear cuttability even for combinations of different ethylene unit contents. Furthermore, a comparison between Example 5 and Example 6 indicates that excellent linear cuttability tends to be achieved when the ethylene unit content of the EVOH forming the pellet (A1) is lower than the ethylene unit content of the EVOH forming the pellet (A2).

In addition, a comparison of Example 1 with Comparative Examples 1 and 4 indicates that, when the pellet (A1) and the pellet (A2) were initially melt-molded to form a pellet, and thereafter a monolayer film was produced using the pellet (Comparative Examples 1 and 4), the obtained monolayer film had poor linear cuttability as compared with a case where the monolayer film was produced by directly melt-molding the pellet (A1) and the pellet (A2) (Example 1). Also, a comparison of Example 1 with Comparative Examples 2 and 3 indicates that the monolayer films (Comparative Examples 2 and 3) obtained by directly melt-molding the resin pellet groups that did not contain the pellet (A1) or the pellet (A2) had poor linear cuttability as compared with the monolayer film obtained by directly melt-molding the resin pellet group containing both the pellet (A1) and the pellet (A2) (Example 1).

This demonstrates that, when a predetermined molded body such as a film is obtained by directly melt-molding a resin pellet group including a combination of the pellet (A1) and the pellet (A2) as in the case of the present invention, the molded body has excellent linear cuttability.

Figure 2:
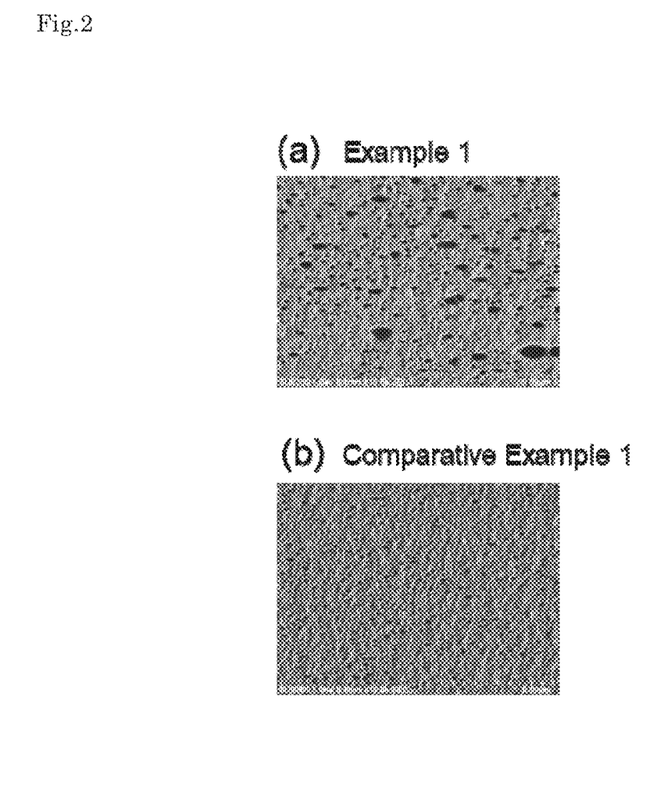
FIG. 2(a) is a scanning electron micrograph of a cross section in the TD direction, used for measuring the average particle size of a monolayer film obtained in Example 1.
FIG. 2(b) is a scanning electron micrograph of a cross section in the TD direction, used for measuring the average particle size of a monolayer film obtained in Comparative Example 1.

FIG. 2 shows scanning electron micrographs of Example 1 and Comparative Example 1, as measured when measuring the average particle size in accordance with the evaluation method (5) above. As shown in FIG. 2(a), for the monolayer film of Example 1 obtained by directly melt-molding the resin pellets, dispersion phases with relatively large particle sizes were observed. In contrast, for the monolayer film (FIG. 2(b)) of Comparative Example 1 produced by initially melt-kneading the resin pellet group to form pellets (melt-kneaded pellets) and thereafter using the melt-kneaded pellets to form a monolayer film, no dispersion phases with sizes as observed in FIG. 2(a) were observed, and only dispersion phases with relatively small sizes were observed.

INDUSTRIAL APPLICABILITY

The resin pellet group according to the present invention is useful for packaging for various products in technical fields such as those relating to food and beverages, pet food, fat and oil industries, and pharmaceuticals, for example.

REFERENCE SIGNS LIST

100 Sample
102, 102' Notch
104, 106 Cut piece
110 Point at one end in lateral direction
$L_0$ Reference line
$L_1$ Stop line
$L_2$ Breakage stop line
$T_R$ Distance from reference line $L_0$ to breakage stop line $L_2$

The invention claimed is:

1. A resin pellet group comprising:
a pellet (A1) containing an ethylene-vinyl alcohol copolymer (a1); and
a pellet (A2) containing an ethylene-vinyl alcohol copolymer (a2),
wherein the pellet (A1) has a melt tension of 10 mN or more and 30 mN or less at a take-up speed of 50 m/min and 210° C., and the pellet (A2) has a melt tension of 2 mN or more and less than 10 mN at a take-up speed of 50 m/min and 210° C.,
an ethylene unit content ($EC_{a1}$) of the ethylene-vinyl alcohol copolymer (a1) is different from an ethylene unit content ($EC_{a2}$) of the ethylene-vinyl alcohol copolymer (a2), and
a mass ratio (A1/A2) of the pellet (A1) to the pellet (A2) is 20/80 or more and 99/1 or less.

2. The resin pellet group according to claim 1, wherein a total content of the ethylene-vinyl alcohol copolymer (a1) and the ethylene-vinyl alcohol copolymer (a2) is above 95 mass % relative to a total mass of the resin pellet group.

3. The resin pellet group according to claim 1, wherein an absolute value of a difference between the ethylene unit content ($EC_{a1}$) of the ethylene-vinyl alcohol copolymer (a1) and the ethylene unit content ($EC_{a2}$) of the ethylene-vinyl alcohol copolymer (a2) is 5 mol % or more.

4. The resin pellet group according to claim 1, wherein the ethylene unit content ($EC_{a2}$) of the ethylene-vinyl alcohol copolymer (a2) is larger than the ethylene unit content ($EC_{a1}$) of the ethylene-vinyl alcohol copolymer (a1).

5. The resin pellet group according to claim 1, wherein the ethylene unit content ($EC_{a1}$) of the ethylene-vinyl alcohol copolymer (a1) is 20 mol % or more and 50 mol % or less, and the ethylene unit content ($EC_{a2}$) of the ethylene-vinyl alcohol copolymer (a2) is 30 mol % or more and 60 mol % or less.

6. The resin pellet group according to claim 1, wherein the pellet (A1) has a melt tension of 10 mN or more and 30 mN or less at a take-up speed of 80 m/min and 210° C., and the pellet (A2) has a melt tension of 2 mN or more and less than 10 mN at a take-up speed of 80 m/min and 210° C.

7. The resin pellet group according to claim 1, wherein the mass ratio (A1/A2) is 50/50 or more and 99/1 or less.

8. The resin pellet group according to claim 1, wherein the resin pellet group is used for being directly melt-molded.

9. The resin pellet group according to claim 1, wherein the pellet (A1) has a melt flow rate (MFR) from 3.3 to 4.0 g/10 min under a load of 2160 g, as measured in accordance with JIS K 7210:2014.

10. The resin pellet group according to claim 1, wherein the pellet (A2) has a melt flow rate (MFR) from 13 to 21 g/10 min under a load of 2160 g, as measured in accordance with JIS K 7210:2014.

11. The resin pellet group according to claim 1, wherein the pellet (A1) has a melt tension of 11 mN or more and 24 mN or less at a take-up speed of 50 m/min and 210° C., and the pellet (A2) has a melt tension of 2 mN or more and less than 8 mN at a take-up speed of 50 m/min and 210° C.

12. The resin pellet group according to claim 1, wherein the pellet (A1) has a melt tension of 13 mN or more and 14 mN or less at a take-up speed of 80 m/min and 210° C., and the pellet (A2) has a melt tension of 4 mN or more and less than 9 mN at a take-up speed of 80 m/min and 210° C.

13. A layer structure comprising a gas barrier layer formed from a melt-molded body of the resin pellet group according to claim 1.

14. The layer structure according to claim 13, wherein the gas barrier layer includes a matrix phase containing the ethylene-vinyl alcohol copolymer (a1) as a main component, and a dispersion phase containing the ethylene-vinyl alcohol copolymer (a2) as a main component, and the dispersion phase has an average particle size of 200 nm or more and 1.0 µm or less.

15. The layer structure according to claim 13, further comprising a thermoplastic resin layer disposed on at least one side of the gas barrier layer.

16. The layer structure according to claim 13, comprising a coextruded structure of the gas barrier layer and the thermoplastic resin layer.

17. A stretched multilayer structure comprising the layer structure according to claim 13.

18. A packaging material comprising the layer structure according to claim 13.

19. A container comprising the layer structure according to claim 13.

20. A method for producing the layer structure according to claim 13, the method comprising directly melt-molding the resin pellet group, to form a gas barrier layer.

\* \* \* \* \*